Figure 1:
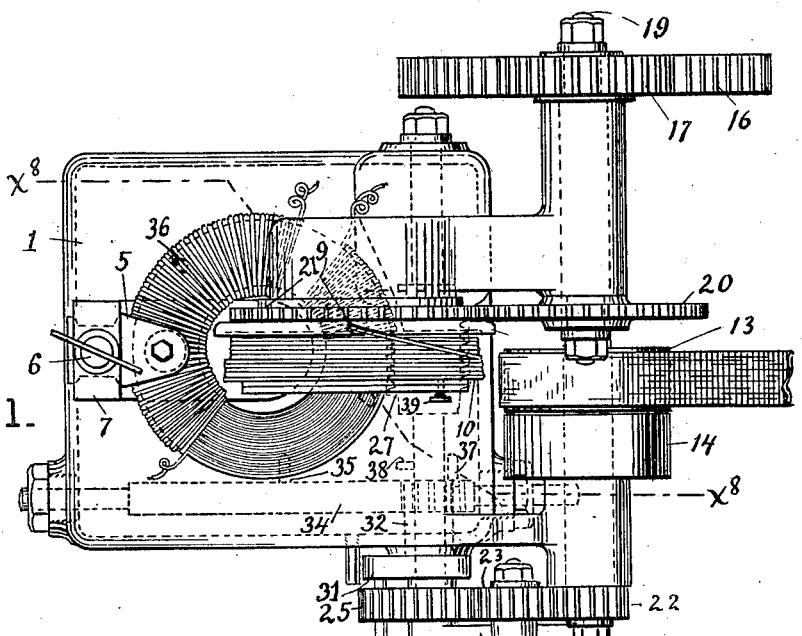

No. 697,660. Patented Apr. 15, 1902.
M. I. PUPIN & S. W. BALCH.
WINDING MACHINE.
(Application filed Aug. 31, 1901.)

(No Model.) 2 Sheets—Sheet 1.

Witnesses: Inventors,
Geo. L. Wheelock. Michael I. Pupin.
Harry J. Moynihan. Samuel W. Balch.

THE NORRIS PETERS CO., PHOTO LITHO., WASHINGTON, D. C.

No. 697,660. Patented Apr. 15, 1902.
M. I. PUPIN & S. W. BALCH.
WINDING MACHINE.
(Application filed Aug. 31, 1901.)

(No Model.) 2 Sheets—Sheet 2.

Witnesses:
Geo. S. Wheelock
Harry J. Moynihan

Inventors,
Michael I. Pupin.
Samuel W. Balch

UNITED STATES PATENT OFFICE.

MICHAEL I. PUPIN, OF NEW YORK, N. Y., AND SAMUEL W. BALCH, OF MONTCLAIR, NEW JERSEY.

WINDING-MACHINE.

SPECIFICATION forming part of Letters Patent No. 697,660, dated April 15, 1902.

Application filed August 31, 1901. Serial No. 73,985. (No model.)

*To all whom it may concern:*

Be it known that we, MICHAEL I. PUPIN, a resident of New York city, borough of Manhattan, in the county and State of New York, and SAMUEL W. BALCH, a resident of Montclair, in the county of Essex and State of New Jersey, citizens of the United States of America, have invented certain new and useful Improvements in Winding-Machines, of which the following is a specification.

This machine has been designed for winding ballast-coils similar to the coils shown in United States Letters Patent Nos. 652,230 and 652,231, both dated June 19, 1900, and granted to Michael I. Pupin, one of the joint applicants of this application. The core of the coil to the winding of which this machine is particularly adapted is annular, with an interior diameter of about one-half the exterior diameter, and having a cross-section which is either approximately circular or square with the corners rounded. There are two windings, each extending nearly half-way around the core. The problem of winding a coil of this character has not heretofore been worked out so far as we know, and in winding-machines which have heretofore been devised the object has been either to place upon the core a considerable number of distinct windings each covering but a small portion of the circumference or else to cover the entire core with a single winding, which is usually of tape, for the purpose of protecting and insulating the core from the coils of wire which are subsequently applied. These conditions have given rise to two classes of winding-machines. In one class, since but a small section of the core is covered at each winding operation, the core is supported usually in fixed clamps, and if any feed movement is provided, so that the coils will be laid side by side, this feed movement is usually in a right line and is either a feed movement of the strand of wire as it passes onto the core or is a rectilinear movement of the support for the core. In the other class of winding-machines, since the entire core is to be covered at one operation, the core is fed circularly; but no clamps can be used to hold the core in secure relation to the machine. The core is therefore guided between feed-wheels or other guides, and it is fed around by the rotation of the feed-wheels.

In a winding-machine for the ballast-coils described a circular feed for the core is necessary, as in the second of the above-described classes of winding-machines; but since only half of the circumference is to be covered at one winding operation advantage is taken of this fact to firmly support in a clamp the side of the core which is not being wound, and the expedient is adopted, which is believed to be novel in winding-machines, of making this clamp movable by mounting it on a spindle in a fixed bearing the axis of which coincides with the axis of the core, and the core is fed to the winding mechanism by slowly feeding the movable clamp about the axis of this bearing.

It is important that there should be precisely the same number of turns in each winding of ballast-coils, and to assist in securing this result the feed motion of the clamp for the annular core is communicated through a reversing mechanism, which is thrown when the clamp has been fed through the required angle. To insure that this reversal shall always take place at precisely the same point in the movement of the mechanism, a quick-acting mechanism is provided for throwing the reversing mechanism, and this is brought into engagement by a more slowly moving dog which is carried with the clamp.

In a machine for winding wire on annular cores it is necessary before applying each winding to a core to transfer the requisite length of wire for a winding to a suitable wire-carrying device or bobbin, on which the entire body of wire to be wound or remaining to be wound can be carried around the core as the coils are wound on the core. In some winding-machines this wire-carrying device is a bobbin of small enough diameter to pass through the hole in the core, and the bobbin is pivoted to the periphery of a ring which encircles the core and does the winding. In other winding-machines and in the one here illustrated the wire is carried on a coil which is concentric with the winding-ring.

In the practical design of a machine with the features above indicated various other novel features have been introduced, which are hereinafter also more particularly pointed out and claimed.

Figure 2:
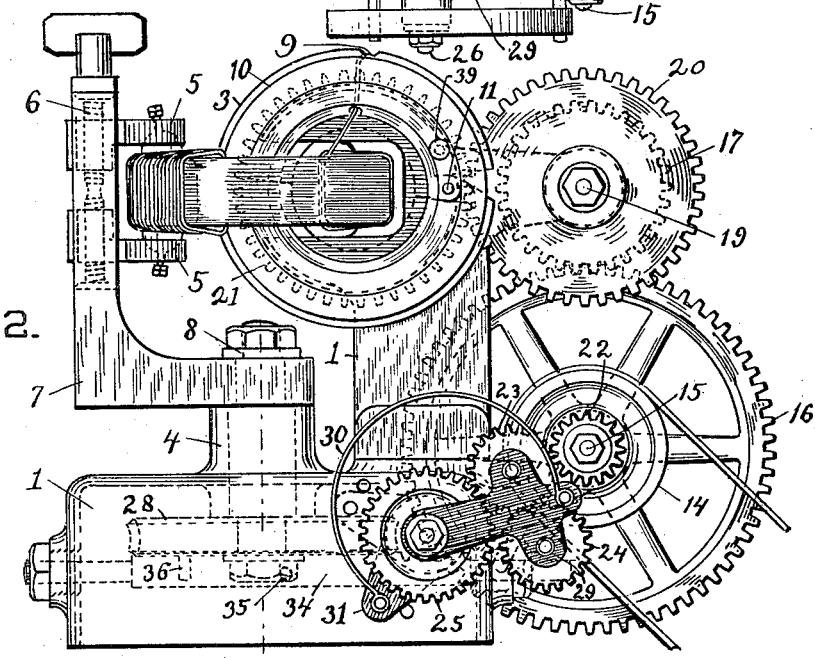
Figure 3:
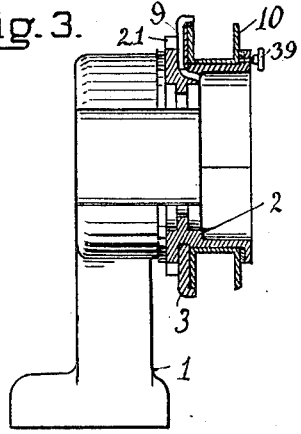
Figure 4:
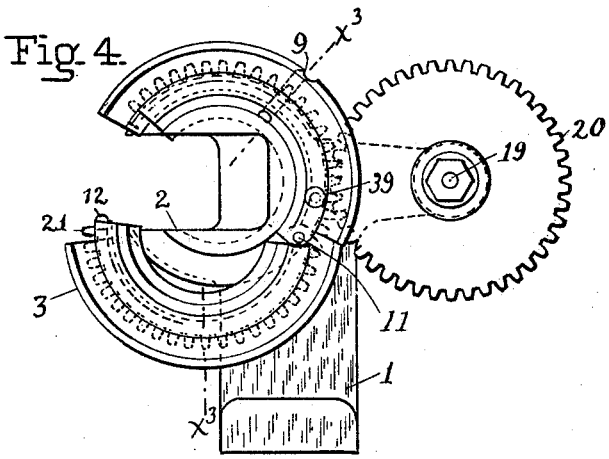
Figure 5:
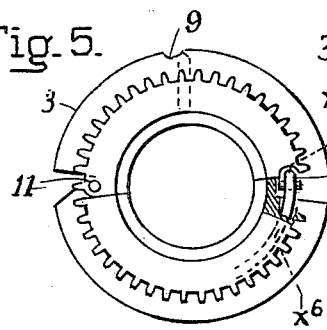
Figure 6:
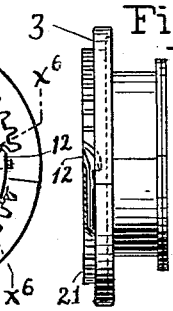
Figure 7:
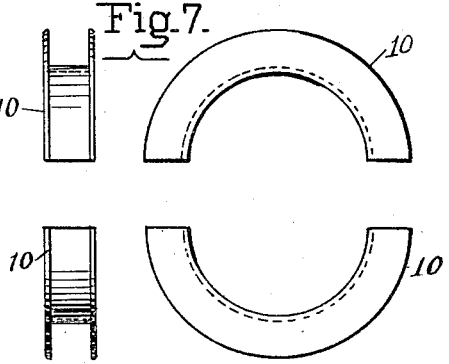
Figures 8, 9:
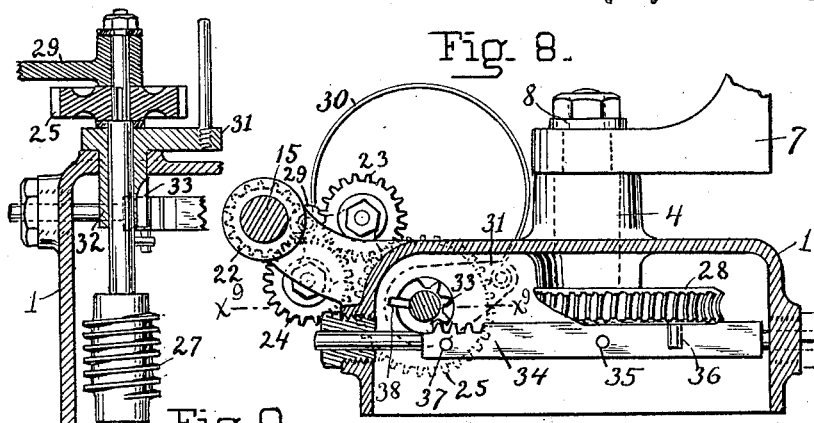
Figure 10:
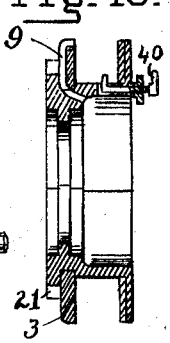

In the accompanying two sheets of drawings, which form a part of this specification, Figure 1 is a top view of the machine. Fig. 2 is a side view of the machine. Fig. 3 is a view of the fixed bearing for the wire carrying and winding ring and a section through the wire carrying and winding ring on the line $x^3 \, x^3$ of Fig. 4. Fig. 4 is a view of the same parts from another side, with the wire carrying and winding ring open to permit the insertion or removal of a core. Figs. 5 and 6 are front and side views of the winding-ring. Fig. 7 shows side and front views of the parts for the wire-carrying bobbin. Fig. 8 is a vertical section on the line $x^8 \, x^8$ of Fig. 1, showing the tripping devices for the reversing mechanism. Fig. 9 is a horizontal section on the line $x^9 \, x^9$ of Fig. 8. Fig. 10 is a section through a diameter of a modified form, in which the same parts serve the double purpose of a carrier for the coil of wire and for laying the coils around the core.

The construction of the machine in detail is as follows:

A suitable supporting-framework 1 has a fixed bearing 2, with a horizontal axis for a wire carrying and winding device 3. The framework also has a fixed bearing 4, with a vertical axis, which is a support for the clamp which carries the core. This consists of clamping-jaws 5, which are actuated by a right and left hand screw 6 and are carried on an angle-arm 7, in which a spindle 8 is firmly secured and journaled in the bearing in the framework. The clamp is consequently movable about the axis of this spindle. The parts are so shaped that the core will be held between the jaws with its axis in line with the axis of the spindle-bearing.

The wire carrying and winding device is an annular member with means consisting of the guide-hole 9 in its flange by which a strand of wire threaded through this guide-hole can be wound on the core. The wire to be wound is stored on a bobbin 10, which is free to revolve about the same axis as the annular member and is preferably carried thereby. The annular member constituting the winding device is in two parts, separated by a diameter. They are hinged together on one side by the hinge 11, and on the other side they are held together by a latch 12. The bobbin is likewise in halves; but it is not necessary that the halves should be hinged together and latched, since the parts are held in place by the overhanging rim of one of the flanges of the wire-winding device.

A motion-transmitting mechanism actuates the wire carrying and winding device and feeds the clamp for the core. This mechanism is driven by a belt on the tight pulley 13. Beside this pulley is a loose pulley 14, to which the belt can be shifted to stop the mechanism. The tight pulley is fast on a pulley-shaft 15. It actuates the wire carrying and winding device through gears 16 and 17 on the ends of this shaft and a second shaft 19. These gears are held on the ends of these shafts by means of nuts, and they can be readily removed and replaced by other gears to change the speed of winding with respect to the feeding mechanism when a change is made in the size of the wire. A gear 20 on the second shaft meshes with gear-teeth 21 on the wire carrying and winding device. On the other end of the pulley-shaft is a gear 22, from which feed motion is transmitted to the clamp for the annular core through reversing-gearing consisting of two intermediate gears 23 24, one or both of which, according to the direction in which the reversing mechanism is thrown, are intermediate between the gear 22 and a gear 25 on the worm-shaft 26. On the worm-shaft is a worm 27, which engages with a worm-wheel 28 on the spindle of the movable clamp for supporting the annular core.

The intermediate gears of the reversing mechanism are mounted on an arm 29, which swings about the axis of the worm-shaft through a limited arc, by which either the gear 23 or the gear 24 may be brought into engagement with the gear 22. This arm is swung by the tension of a spring 30, which connects a pin at the outer end of the arm with a pin at the outer end of a second arm 31, which also swings about the axis of the worm-shaft through a limited arc from the position shown in Fig. 2 to the position shown in Fig. 8. This second arm projects from a sleeve 32, which passes through the base of the machine and is provided with gear-teeth 33 at its inner end. These teeth engage a rack 34. On the side of this rack is a pin 35, which is engaged by pins 36 in the periphery of the worm-wheel. There is also a second pin 37 on the rack, which is engaged by a pin 38 on the worm-shaft to throw the rack more rapidly than it would be thrown by the pin on the slowly-moving worm-wheel.

The reversal of the feed is effected as follows: When the movable clamp has carried the annular core through nearly the desired arc to be covered by a single winding, one of the pins 36 on the periphery of the worm-wheel engages with the pin 35 on the side of the rack. This shifts the rack slightly and brings the pin 37 in the path of the pin 38 on the worm-shaft, and when this comes around it throws the rack rapidly through the remainder of its movement, and the arm 31 is thrown to the opposite extreme of its movement. This carries the end of the spring which is attached thereto to the opposite side of a line drawn through the worm-shaft to which the arm 29 is pivoted and the point of attachment of the spring to this arm 29. The tension of the spring then snaps this arm to its other limit of movement and effects the reversal of the feed motion. It will thus be seen that the reversing mechanism is thrown by two quick-acting devices. One of these is the pin on the worm-shaft which engages with the pin on the rack, and the other is the tension spring between the ends of the two arms which are pivoted to the worm-shaft. The quick action lessens the danger of the reversing mechanism stopping accidentally at a half-way position, in which the transmitting motion for the feed movement is disengaged, and the exact point of reversal is more certain because of this quick action.

The machine is operated as follows: The wire carrrying and winding device is unlatched and the halves separated at one side. The core to be wound is then inserted in the wire carrying and winding device, and the core is secured by the clamp. The wire carrying and winding device is then closed and latched, and the end of the wire which is to be wound on the core is caught on the bobbin by lapping one or more turns over the first coil. The bobbin is then clamped to the winding device by the screw 39, and the machine is run until the requisite amount of wire for a winding on the core is stored on the bobbin and cut off. The bobbin is then unclamped, and the end of the wire at the outer layer on the bobbin is passed through the hole 9 and caught on the core. The machine is again started with the feed motion in gear, and the wire is wound off from the bobbin and onto the core.

The machine may be constructed in accordance with the modification shown in Fig. 10, in which there is no bobbin separate from the winding device for carrying the wire and the wire is carried directly by the winding device. The end of the wire is caught in the clamp 40, and the requisite amount of wire for a winding is wound on the wire carrying and winding device and cut off. The clamp is then loosened, thereby leaving the coil of wire free to revolve on the wire carrying and winding device. The outer end of the wire is then passed through the hole 9 and caught on the core, and the wire is wound onto the core, as in the form first described.

What we claim, and desire to secure by Letters Patent of the United States, is—

1. In a machine for winding wire on annular cores, the combination of a wire carrying and winding device, a movable clamp for the annular core, a fixed bearing for the clamp, and a motion-transmitting mechanism geared with the wire carrying and winding device and with the clamp for the annular core, substantially as described.

2. In a machine for winding wire on annular cores, the combination of a wire carrying and winding device, a fixed bearing for the wire carrying and winding device, a movable clamp for the annular core, a fixed bearing for the clamp, and a motion-transmitting mechanism geared with the wire carrying and winding device and with the clamp for the annular core, substantially as described.

3. In a machine for winding wire on annular cores, the combination of a wire carrying and winding device, a movable clamp for the annular core, a fixed bearing for the clamp, and a motion-transmitting mechanism geared with the wire carrying and winding device and through a reversing mechanism with the clamp for the annular core, substantially as described.

4. In a machine for winding wire on annular cores, the combination of a wire carrying and winding device, a movable clamp for the annular core, a fixed bearing for the clamp, a motion-transmitting mechanism geared with the wire carrying and winding device and through a reversing mechanism with the clamp for the annular core, a quick-acting device for throwing the reversing mechanism, and a slow-acting device operatively connected to the clamp for the annular core and operating to throw the quick-acting device into engagement, substantially as described.

5. In a machine for winding wire on annular cores, the combination of a wire carrying and winding device, a motion-transmitting mechanism geared therewith, a clamp on the wire carrying and winding device for the end of the wire while being wound thereon, and means for releasing the clamp while the wire is on the wire carrying and winding device, substantially as described.

Signed by us in New York city, borough of Manhattan, this 30th day of August, 1901.

MICHAEL I. PUPIN.
SAMUEL W. BALCH.

Witnesses:
GEO. L. WHEELOCK,
THOMAS EWING, Jr.